E. KESLER.
ANIMAL TRAP.
APPLICATION FILED AUG. 1, 1913.

1,093,632.

Patented Apr. 21, 1914.

Inventor
*Elias Kesler.*

Witnesses

By *Victor J. Evans*
Attorney

UNITED STATES PATENT OFFICE.

ELIAS KESLER, OF OKLAHOMA, OKLAHOMA.

ANIMAL-TRAP.

1,093,632.   Specification of Letters Patent.   Patented Apr. 21, 1914.

Application filed August 1, 1913. Serial No. 782,482.

*To all whom it may concern:*

Be it known that I, ELIAS KESLER, a citizen of the United States, residing at Oklahoma city, in the county of Oklahoma and State of Oklahoma, have invented new and useful Improvements in Animal-Traps, of which the following is a specification.

This invention relates to improvements in animal traps and especially with reference to the provision of an entrance tunnel to lead to the cage or confining chamber of the trap, an outer door, an inner door, and a tilting gravity acting platform in the tunnel and over which an animal passes in entering the cage through the tunnel, the doors and the tilting platform being provided with coacting means to cause the platform when in normal position to release the outer door and lock the inner door and when in tilted position to lock the outer door and release the inner door, and thereby permit an animal to readily enter the cage through the tunnel and prevent the animal from thereafter escaping from the cage.

The invention consists in the construction, combination and arrangement of devices hereinafter described and claimed.

Figure 1:
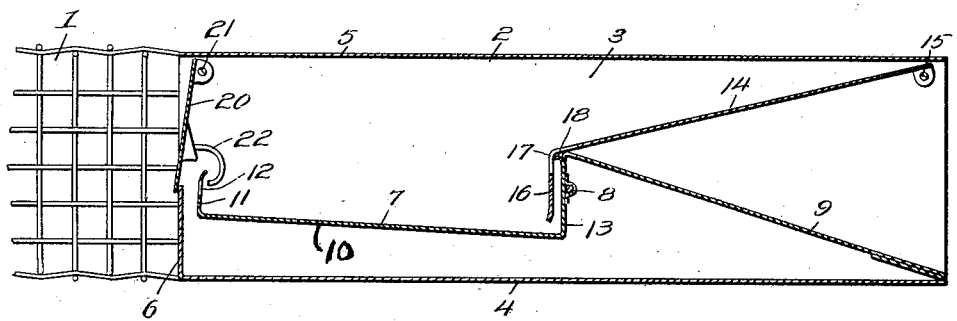
Figure 2:
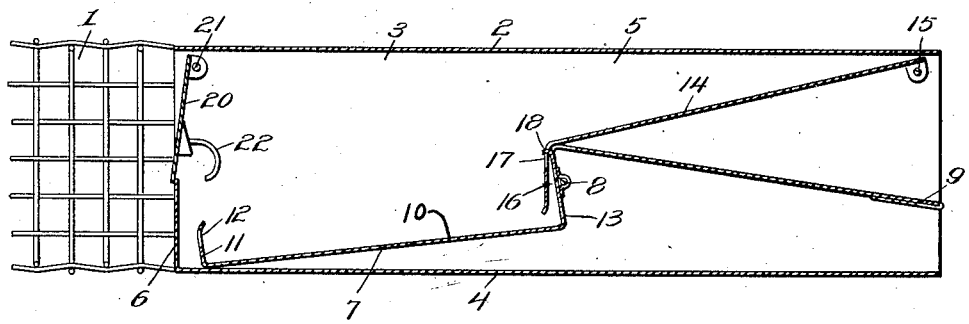

In the accompanying drawings:—Figure 1 is a vertical sectional view of a trap constructed in accordance with my invention, a portion only of the cage being indicated and the tilting platform and outer and inner doors of the tunnel being indicated in normal or set position. Fig. 2 is a similar view of the same showing the platform in tilted position, with the outer door locked and the inner door released as when the platform is operated by the weight of an animal in seeking to enter the cage through the tunnel.

My improved trap may be of any suitable size according to the kind of animals it is desired to catch therewith and the trap may also be made of any suitable material.

For the purposes of this specification, a portion of a cage, which may be of any suitable construction, is indicated at 1. In accordance with my invention, I provide an entrance tunnel 2 which leads to and is attached to the cage. This tunnel is here indicated as of oblong rectangular form with parallel vertical side walls 3, a bottom 4, and a top 5. The ends of the tunnel are open and at the inner end of the tunnel at its lower side there is a cross bar 6 which forms a stop, as will presently appear.

In the lower portion of the tunnel is a tilting platform 7, the fulcrum 8 of which is nearer its inner end than its outer end so that the outer portion 9 of the platform is heavier than the inner portion 10 thereof and, hence, by gravity the outer end 9 of the platform is normally in lowered position, bearing on the bottom of the tunnel and the inner end 10 of the platform is in elevated position, raised a suitable distance above the bottom of the tunnel. The inner end of the platform has an upturned wing 11 which is provided with an opening 12. The outer portion 9 of the platform is inclined and is at an angle to the inner portion 10 and a vertical offset 13 is formed between the portions 9 and 10 of the platform and to one side of the fulcrum or pivoting bar 8.

In the outer portion of the tunnel is an outer door or entrance door 14 which is inclined and is pivotally mounted at its upper side as at 15, the said door being arranged for vertical angular movement and adapted to drop by its own weight but to be readily lifted by an animal who enters the tunnel and passes up on the inclined portion 9 of the platform. At the inner side or end of the outer door 14 is a downturned wing 16 which has an opening 17. This wing is adapted to normally bear on the platform in the angle between the parts 10 and 13. The platform is provided at a point near and above its fulcrum with a catch 18 which is normally disengaged from the opening 17.

At the inner end of the tunnel is an inner door 20 which is pivotally mounted at its upper side as at 21 for vertical angular movement and is adapted to be swung inwardly into the cage 1, the stopbar 6 preventing the said door from being swung in the opposite direction and, hence, said door cannot be swung outwardly into the tunnel. The said door is provided on its outer side, near its lower end with a hook-shaped catch 22 which normally engages the opening 12 and, hence, the said door is normally locked.

When an animal enters the tunnel and passes over the inclined outer portion 9 of the platform, it passes under and readily raises the outer door 14. As the animal passes under the wing 16 of the door and steps on the inner portion 10 of the platform, its weight causes the inner portion of the platform to descend and the outer end 9 thereof to be raised and, hence, as the door 14 drops behind the animal the catch 18 is caused to engage the opening 17 and thereby lock the door 14, thus preventing the escape of the animal through the outer end of the tunnel.

The downward movement of the inner portion 10 of the platform under the weight of the animal causes the wing 11 with its opening 12 to be disengaged from the hook catch 22 so that the animal can readily push under the inner door 20 and enter the cage. As this occurs, the door 20 closes by gravity behind the animal and the platform 7 being relieved of the weight of the animal by gravity reassumes its normal or initial position, with its outer end 9 lowered and its inner end 10 raised, thus, causing the catch 18 to release the outer door 14 and the catch 22 of the inner door 20 to be reëngaged by the wing 11 of the platform so that said inner door becomes locked.

It will be understood from the foregoing that an animal can readily enter my improved trap without being injured thereby but that the animal cannot escape either from the cage of the trap or from the tunnel after it has once passed the outer door 14.

While I have herein shown and described a preferred form of my invention, I would have it understood that changes may be made in the form, proportion and construction of the same without departing from the spirit of my invention and within the scope of the appended claims.

I claim:—

1. In a trap, a cage, an entrance tunnel leading to the cage, an inclined outer door in the outer portion of the tunnel pivotally mounted for vertical angular movement, an inner door at the inner end of the tunnel pivotally mounted for angular movement in a vertical plane and adapted to open into the cage, a stop to prevent the inner door from swinging into the tunnel from the cage, and a tilting gravity-acting platform in the tunnel, arranged with its outer end normally lowered and its inner end normally raised, said platform and said door having coacting means to cause the platform when in normal position to release the outer door and lock the inner door and when in tilted position to lock the outer door and release the inner door.

2. In a trap having an entrance portion, a tiltable platform having a catch and an inclined door in the entrance portion above the platform and pivotally mounted for angular movement in a vertical plane, and adapted to close by its own weight, the said platform and door having coacting means to cause the platform to release the door when the platform is in normal position and to lock the door when the platform is in tilted position.

In testimony whereof I affix my signature in presence of two witnesses.

ELIAS KESLER.

Witnesses:
CHARLES T. GIBSON,
V. H. GIBSON.

---

Copies of this patent may be obtained for five cents each, by addressing the "Commissioner of Patents, Washington, D. C."